2 Sheets--Sheet 1.

JOSEPH KLEIN.
Improvement in Washing-Machines.

No. 127,895. Patented June 11, 1872.

Witnesses:
Franck L. Durand
C. L. Evert

Inventor.
Joseph Klein
per Alexander Mason
Attorneys.

JOSEPH KLEIN.
Improvement in Washing-Machines.
No. 127,895.  Patented June 11, 1872.
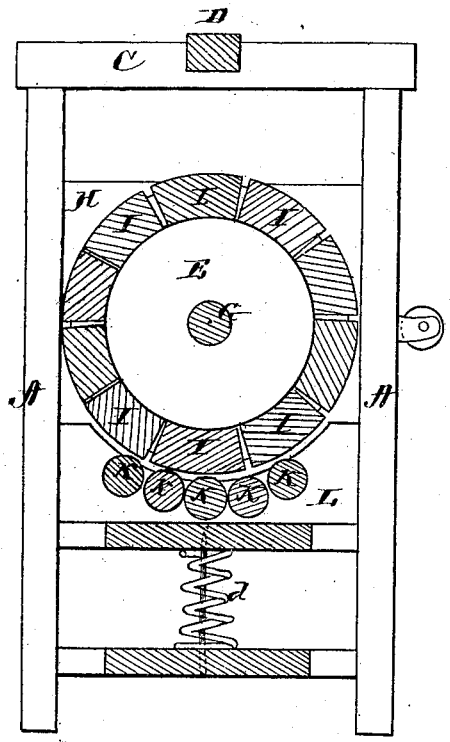
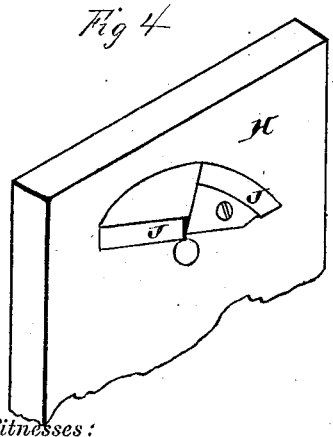
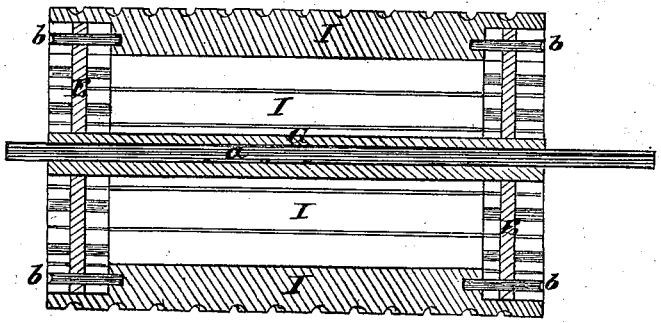

127,895

UNITED STATES PATENT OFFICE.

JOSEPH KLEIN, OF ALLENTOWN, PENNSYLVANIA.

IMPROVEMENT IN WASHING-MACHINES.

Specification forming part of Letters Patent No. 127,895, dated June 11, 1872.

*To all whom it may concern:*

Be it known that I, JOSEPH KLEIN, of Allentown, in the county of Lehigh and in the State of Pennsylvania, have invented certain new and useful Improvements in Washing-Machine; and do hereby declare that the following is a full, clear, and exact description thereof, reference being had to the accompanying drawing and to the letters of reference marked thereon making a part of this specification.

The nature of my invention consists in the construction and arrangement of a "washing-machine," as will be hereinafter more fully set forth.

In order to enable others skilled in the art to which my invention appertains to make and use the same, I will now proceed to describe its construction and operation, referring to the annexed drawing, in which—

Figure 1:
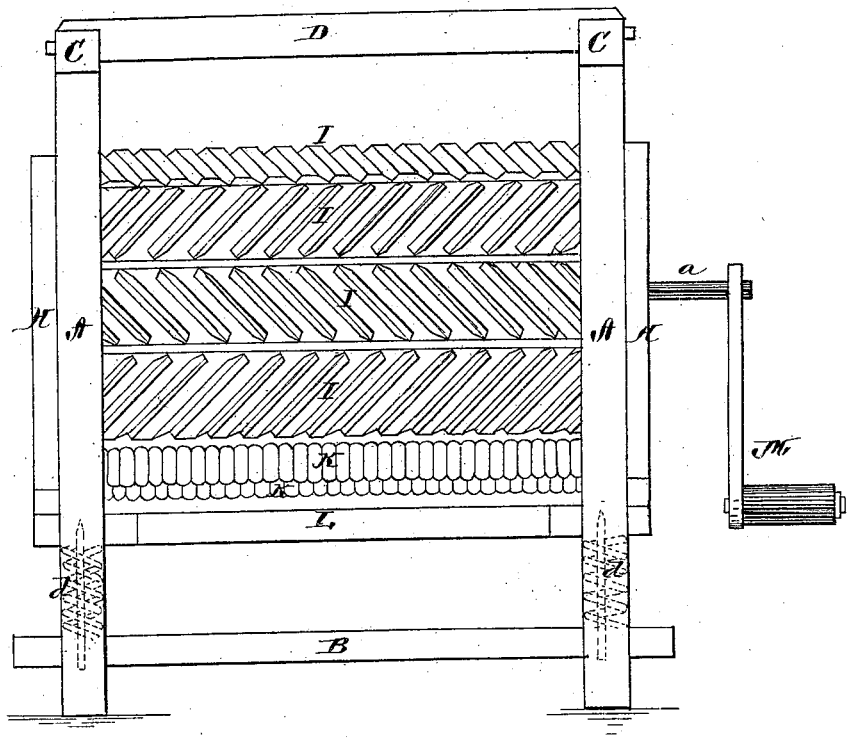
Figure 3:
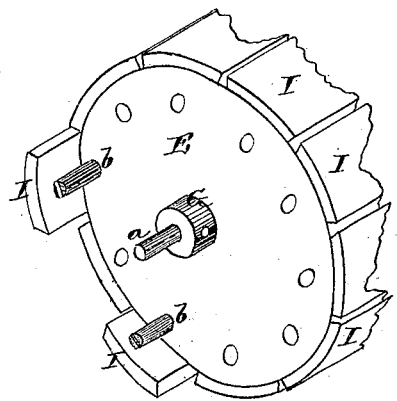

Figure 1 is a side elevation, and Fig. 2 a transverse vertical section, of my washing-machine. Fig. 3 is a perspective view of one end of the washing-roller. Fig. 4 is a perspective view of one of the end pieces of the machine, and Fig. 5 is a longitudinal section of the washing-roller.

A A represent four corner-posts, connected near their lower ends by a platform or brace, B. The upper ends of the two posts at each end are connected by a cross-bar, C, and the two cross-bars C C are in the center connected by a bar, D. The washing roller or cylinder is constructed in the following manner: E E are two metal heads, connected by means of a central tube, G, the ends of which project beyond the heads, as shown in Figs. 3 and 5; or the heads may be connected in the center by a solid shaft having holes in its ends for the insertion of journals. Through the central tube G passes a shaft, *a*, held by set-screws at the ends, said shaft having its bearings in end pieces H H attached to the posts A A. Around the heads E E are placed bars I I, the ends of which are cut out, as shown in Fig. 5, so that a part of each bar will be between the heads, while the cut-out ends project beyond the same. That portion of each bar I which lies between the heads E E is shorter than the distance between the same, and provided at each end with a pin, *b*, passing through the head, as shown. These pins thus hold the bars to the heads at the same time as they will allow the bars to move endwise on the heads. The outer surfaces of the bars are corrugated, as shown in Fig. 1—that is, the corrugations run about at an angle of forty-five degrees, and alternate right and left, the corrugations on each bar running in opposite directions to those on the adjoining back. The ends of the pins *b b* are beveled, so that during the revolution of the cylinder, when they strike cams or teeth J J attached to the inner sides of the end pieces H H, they will slide over the same and move the bars I I from side to side. The cams or teeth J J are arranged at the lower part of the machine in such a manner that each bar will be moved back and forth twice while the bar passes over rollers K K placed under the cylinder. These rollers are grooved or corrugated circumferentially their entire length, and have their journal-bearings in a frame, L, supported on spiral springs *d d* above the bottom platform B and guided by the posts A A.

The cylinder E I is revolved by means of a crank, M, attached to one end of the shaft *a*. The machine being placed in a tub, the clothes are passed between the cylinder and the rollers K K. The corrugated bars I I, by their movements as described, rub the clothes in every direction.

Having thus fully described my invention, what I claim as new, and desire to secure by Letters Patent, is—

1. A series of corrugated bars placed around and moving with two revolving heads, and each bar moving separately and independently of the others back and forth endwise one or more times during each revolution of the heads, substantially as herein set forth.

2. A washing-cylinder, consisting of a series of bars placed around and moving with two circular heads, when the corrugations on said bars are inclined and alternate in opposite directions, substantially as herein set forth.

3. The combination of the heads E E, corrugated bars I I, pins *b b*, and cams or teeth J J, all constructed and arranged substantially as and for the purposes herein set forth.

4. In combination with the cylinder E I, constructed as described, I claim the circumferentially-corrugated rollers K K, having their bearings in the frame L supported by the springs d d, substantially as and for the purposes herein set forth.

5. The combination of the frame A B C D, cylinder E I, pins b b, tube G, shaft a with crank M, end pieces H H, rollers K K, frame L, and springs d d, all constructed and arranged substantially as and for the purposes herein set forth.

In testimony that I claim the foregoing I have hereunto set my hand this 18th day of April, 1872.

JOSEPH KLEIN.

Witnesses:
NATHAN MILLER,
GIDEON KUHNS.